Patented Aug. 9, 1932

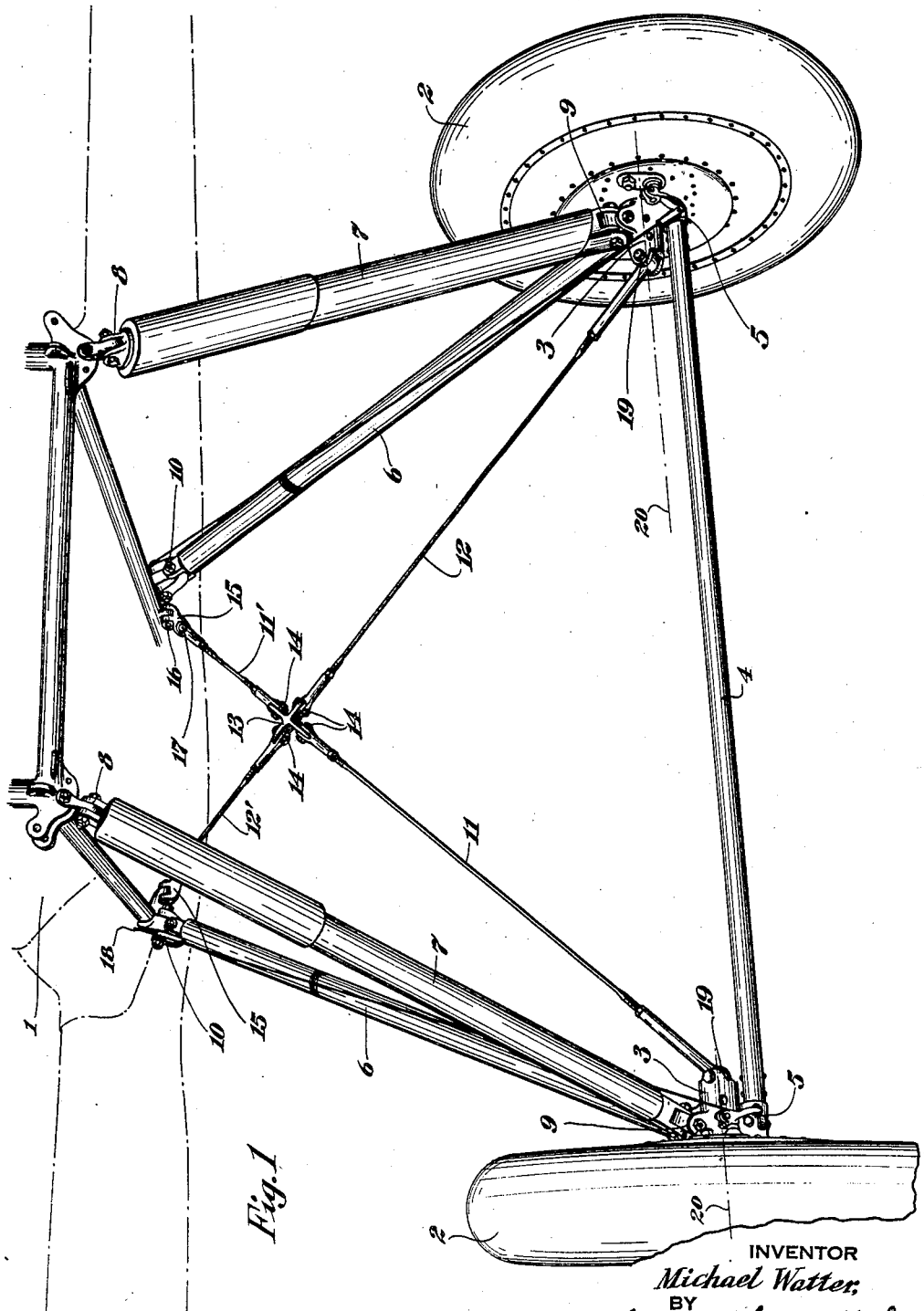

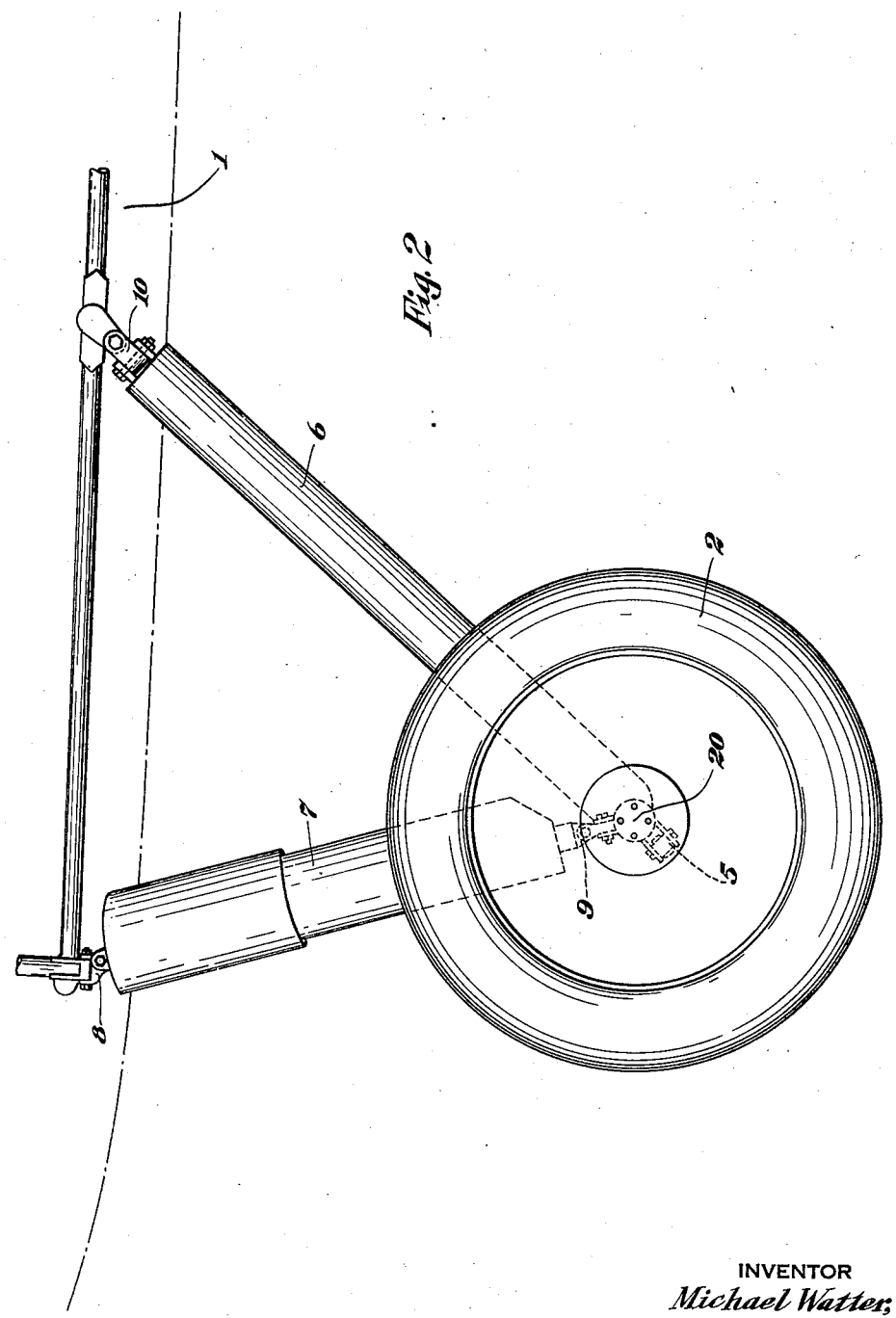

1,870,826

UNITED STATES PATENT OFFICE

MICHAEL WATTER, OF NEW YORK, N. Y., ASSIGNOR TO CHANCE VAUGHT CORPORATION, OF HARTFORD, CONNECTICUT, A CORPORATION OF DELAWARE

LANDING CHASSIS FOR AIRCRAFT

Application filed October 24, 1931. Serial No. 570,776.

This invention relates to landing chassis or gears for aircraft.

One object of the invention is a novel landing chassis having the advantageous characteristics of both the split axle and through axle types, with certain disadvantages of both of these types obviated. A further object of the invention is a novel landing gear characterized by its flexibility in operation its light construction and its ability to stand up under severe service conditions. A further object of the invention is a landing gear comprising independently movable stub axles which are spaced by a tension spreader member universally and eccentrically connected thereto. A further object of the invention is a landing gear braced in a transverse plane by means of wires and particularly wires centrally attached to a cross link. A further object of the invention is a landing gear comprising axle units which are carried by struts universally connected with the craft with flexible means bracing the axles against lateral movement but permitting individual movement thereof. A further object of the invention is a landing gear comprising a pair of stub axles carried by V struts universally connected to the craft frame and braced laterally by diagonal wires centrally attached to a cross link disposed in the plane of the axles and one pair of struts.

For a better understanding of the above indicated objects of the invention and other features which will hereinafter appear, reference may be had to the accompanying drawings which illustrate one embodiment of the invention wherein:

Fig. 1 is a perspective view of a landing chassis for aeroplanes, and

Fig. 2 is a side view thereof.

Referring to the drawings, I have shown my invention as applied to an aeroplane comprising a fuselage 1, the other parts of the aeroplane being omitted for convenience in illustration. The landing gear comprises a pair of wheels 2 which are mounted upon stub axles carried by or formed integral with the axle housing members 3. The stub axles or housings 3 are spaced by a tension spreader member 4, the latter being fastened to the housings 3 by means of universal connections 5 thereby permitting the wheels 2 to move and yield independently of each other in vertical planes. Each stub axle or housing is carried by a rigidly attached strut 6 and universally attached strut 7, the struts 7 in the particular embodiment shown being a yielding or spring cushioning strut, as for example of the known oleo type. Each of the struts 7 is fastened to the fuselage 1 by means of a universal connection 8 and the axle housing 3 by a similar or other universal connection 9. Each of the struts 6 is connected with the fuselage by means of a universal connection 10, while the lower ends of these struts 6 are rigidly attached to the housings 3 of the stub axles. The landing gear thus constructed is braced transversely against lateral movements by means of wires 11 and 12 and 11' and 12', these wires being preferably streamlined and being attached to a somewhat centrally disposed cross link 13. Each of the wires is connected to this cross link 13 by means of a simple pivotal connection 14 permitting free pivotal movement about this cross link in the plane of the axle 4 and struts 6. The wires 11' and 12' are connected with the fuselage by means of universal connections, and in the particular and preferred embodiment shown each of these universal connections comprises a hinge member 15 pivoting about a transverse horizontal axis 16 and a pivotal connection 17 between each hinge 15 and its corresponding wire, each of these pivotal connections 17 being disposed at an angle (approaching a right angle) to the pivotal connection 14. In the particular embodiment shown the wires 11' and 12' are connected with the fittings 18 by which the universal connections 10 of the rear struts 6 are fastened to the fuselage. The lower ends of the wires 11 and 12 are fastened to the housings 3 by means of pivotal connections 19, the latter being disposed at an angle to the pivotal connections 14. The axes of the stub axles are indicated at 20 and the spreader tube 4 is connected with the axle housings eccentrically of these axes, the connections 5 being disposed below the level of the axes and below the connections of the V struts with the housings. By reason of the eccentric connection of the tube member 4 with the axle housing the tension force of the tube or member 4 opposes the bending moment of the struts set up by the ground reaction of the wheels and accordingly the structure may be thereby made of lighter construction. Similarly the wires 11 and 12 are eccentrically connected with the housing to function cooperatively with the tension spreader member 4 to oppose the bending moments imposed upon the struts of the landing gear with similar advantageous results.

The operation of the landing gear thus set forth is clear from the above description. Each wheel 2 may freely take up any position. The gear is characterized by its flexibility and the ability to traverse rough and uneven ground without undue shocks and capsizing forces, each wheel being free to follow the contour of the ground practically independently of the other, and, moreover, the landing gear is not subject to any appreciable lateral movement, and the freedom of fore and aft and vertical movement is limited by the shock absorbing struts 7. The landing gear, therefore, embodies the free and independent movement characteristic of landing wheels of the split axle type and the free fore and aft movement with no side movement which is characteristic of the axle type landing gear, and, moreover, the landing gear as above described is characterized also by its lightness in weight and its endurance under the severe service conditions.

I claim:

1. A landing chassis for aeroplanes comprising a pair of axle units braced by struts universally connected with the craft frame, a tension spreader member universally connected to said axle units and flexible transverse bracing means between the craft frame and said stub axles for preventing lateral movement.

2. A landing chassis of the character set forth in claim 1 wherein the tension spreader member is eccentrically connected with the stub axles.

3. A landing chassis of the character set forth in claim 1 wherein the transverse bracing means comprises diagonal wires connected between the stub axles and points remote from the connections of the corresponding struts with the craft frame.

4. A landing chassis of the character set forth in claim 1 wherein the transverse bracing means comprises diagonal wires connected between the stub axles and points remote from the connections of the corresponding struts with the craft frame, said diagonal wires being interrupted at their intermediate points with a cross connecting link disposed therein.

5. A landing chassis of the character set forth in claim 1 wherein the transverse bracing means comprises diagonal wires connected between the stub axles and points remote from the connections of the corresponding struts with the craft frame, by means of universal connections.

6. A landing chassis of the character set forth in claim 1 wherein the transverse bracing means comprises diagonal wires connected between the stub axles and points remote from the connections of the corresponding struts with the craft frame, said diagonal wires being interrupted at their intermediate points with a cross connecting link disposed therein, the wires having universal connections with the craft frame.

7. A landing chassis of the character set forth in claim 1 wherein the transverse bracing means comprises diagonal wires connected between the stub axles and points remote from the connections of the corresponding struts with the craft frame, and eccentrically connected with the stub axle.

8. A landing chassis of the character set forth in claim 1 wherein the transverse bracing means comprises diagonal wires connected between the stub axles and points remote from the connections of the corresponding struts with the craft frame, with the wires and the tension spreader member both eccentrically connected with the stub axle.

9. A landing chassis of the character set forth in claim 1 wherein the transverse bracing means comprises diagonal wires connected between the stub axles and points remote from the connections of the corresponding struts with the craft frame, with the wires and the tension spreader member both eccentrically connected with the stub axle at points below the axes of the stub axles.

10. A landing chassis of the character set forth in claim 1 wherein the transverse bracing means comprises diagonal wires connected between the stub axles and points remote from the connections of the corresponding struts with the craft frame, with the wires and the tension spreader members both eccentrically connected with the stub axle, and the diagonal wires being discontinued at their crossing points and connected with a cross link.

11. A landing chassis of the character set forth in claim 1 wherein the transverse bracing means comprises diagonal wires connected between the stub axles and points remote from the connections of the corresponding struts with the craft frame, said diagonal wires being discontinued at their crossing points and pivotally connected with a cross link.

In testimony whereof, I have signed my name to this specification.

MICHAEL WATTER.

CERTIFICATE OF CORRECTION.

Patent No. 1,870,826.  August 9, 1932.

MICHAEL WATTER.

It is hereby certified that the name of the assignee in the above numbered patent was erroneously written and printed as "Chance Vaught Corporation", whereas said name should have been written and printed as Chance Vought Corporation, as shown by the records of assignments in this office; and that the said Letters Patent should be read with this correction therein that the same may conform to the record of the case in the Patent Office.

Signed and sealed this 22nd day of November, A. D. 1932.

(Seal)

M. J. Moore,
Acting Commissioner of Patents.